Dec. 10, 1963

Z. FOX 3,113,583

RELIEF VALVE

Filed Dec. 22, 1960

INVENTOR.
ZOLA FOX
BY
Curtis, Morris & Safford
ATTORNEYS

United States Patent Office 3,113,583
Patented Dec. 10, 1963

3,113,583
RELIEF VALVE
Zola Fox, Verona, N.J., assignor to Thiokol Chemical Corporation, Bristol, Pa., a corporation of Delaware
Filed Dec. 22, 1960, Ser. No. 77,642
4 Claims. (Cl. 137—220)

The present invention relates to pressure relief valves and more particularly to improvements in pressure relief valves of the pilot operated type.

While the relief valve of the present invention may have other applications, it is particularly adapted for use with cryogenic and corrosive fluids as they are pumped through passages of a rocket engine. As an example, the cryogenic fluids may include liquid oxygen, liquid hydrogen, liquid nitrogen, etc., and the corrosive fluids may comprise concentrated nitric acid, hydrogen peroxide, concentrated ammonia, etc. To prevent excessive pressures from being developed by the pumped fluid, an automatically operated relief valve is provided in the fluid transmission line. It is especially difficult to find suitable materials for dynamic seals as, for example, O rings on a moving piston used on conventional relief valves, which will withstand the action of the fluids used. However, where it is only necessary to seal statically the problem of materials is greatly simplified.

One of the objects of the present invention is to provide a pilot operated relief valve which eliminates dynamic sealing elements to adapt it for cryogenic and corrosive fluids while at the same time providing a relief valve which is reliable in operation to open a passage when a predetermined pressure is exceeded.

Another object is to provide a pilot operated relief valve of the type indicated which has a snap-open characteristic and chatter-free operation to relieve fluid pressure in a line.

Another object is to provide a relief valve of the type indicated having a cavitating Venturi section for producing a substantially constant mass flow rate with a wide range of variation in the downstream pressure.

Still another object is to provide a pilot operated Venturi relief valve which is of simple and compact construction, of small size for producing the required flow rate, and one having a low pressure drop and flow limiting characteristic.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

Figure 1:
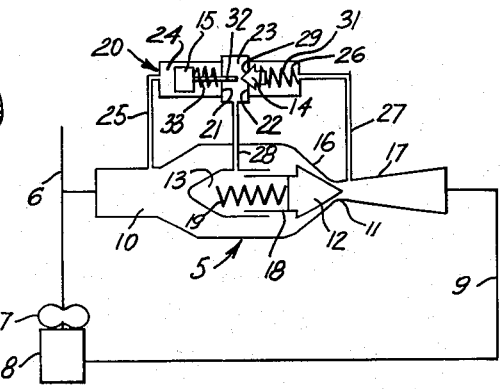
FIGURE 1 is a diagrammatic view of a fluid transmission system incorporating the pilot operated Venturi relief valve of the present invention.

Referring to FIGURE 1 of the drawings, the pilot operated Venturi relief valve 5 of the present invention is shown connected in a fluid transmission line 6 including a pump 7 and which is adapted to open when the pressure in the line exceeds a predetermined value. The relief valve 5 of the present invention may have other applications, but is particularly adapted for controlling the flow of cryogenic and corrosive materials to a rocket engine. For the purpose of illustrating the invention, the suction side of the pump 7 is shown connected to a reservoir vessel 8 for delivering fluid to the transmission line 6 and the relief valve 5 is shown in a loop circuit 9 connected between the fluid transmission line 6 at the outlet from the pump and the reservoir vessel or tank 8.

The relief valve 5 comprises, in general, a conduit 10 having a Venturi section 11, a spring actuated poppet-type relief valve 12 extending into a chamber 13, a spring actuated pilot valve 14 operated by the upstream pressure for controlling the operation of the relief valve and a booster piston 15 for augmenting the operation of the pilot valve 14. Conduit 10 is formed by the walls of a casing having a converging section 16 and a diverging section 17 adjacent the converging section to produce the Venturi throat 11. The converging wall section 16 forms a conical valve seat which is normally engaged by the conical head of the poppet valve 12. A stem 18 projects rearwardly from the head of relief valve 12 into the chamber 13 and a spring 19 acts between the wall of the chamber 13 and valve to normally engage the valve with its valve seat at a predetermined pressure as produced by the spring. The valve stem 18 has a sliding fit with the wall of the chamber 13, but with sufficient clearance to permit the pressure of the fluid in the conduit 10 to be transmitted to the interior of the chamber 13.

Positioned outside of the conduit 10 is a separate passageway 20 having partition walls 21 and 22 forming a central chamber 23 therebetween, a chamber 24 connected to the conduit 10 upstream from the relief valve 12 by a conduit 25 and a chamber 26 connected to the conduit 10 downstream from the valve 12 by a conduit 27. Chamber 13 in the conduit 10 is connected to the central chamber 23 of the passageway 20 by a conduit 28. Partition 22 is formed with a central opening 29 forming a valve seat which is closed by a poppet type pilot valve 14. A spring 31 acts between the casing forming the passageway 20 and the pilot valve 30 to hold the valve in closed position against the valve seat formed by opening 29 with a predetermined spring pressure. The piston 15 closely fits the chamber 24 and has a stem 32 in alignment with the end of the pilot valve 14. A spring 33 acting between the partition wall 21 and piston 15 normally holds the piston 15 in retracted position relative to the pilot valve 14.

Assuming for purposes of description that the pump 7 is operating to deliver fluid from the reservoir tank 8 through the transmission line 6 for delivery to, for example, the combustion chamber of a rocket engine. The pump 7 continues to deliver the fluid through the transmission line 6 until the pressure of the fluid exceeds a predetermined value. During such normal operation, the fluid under pressure flows around the stem 18 of relief valve 12 into chamber 13, and then through the conduit 28 to the central chamber of the separate passageway 20 so that the fluid acts on the entire rearward face of the valve 12 to hold it in closed position. The pressure in the central chamber 23 of passageway 20 also is applied against the right hand side of the piston 15 which counterbalances the pressure applied to the left hand of the piston through the conduit 25. The end of the pilot valve 14 also is subjected to the pressure of the fluid and acts against the force applied by spring 31.

When the fluid pressure exceeds a predetermined value as controlled by spring 31, the pilot valve 14 is actuated to open position. The high pressure fluid in the chamber 23 then flows through the chamber 26 and conduit 27 to the downstream side of the closed relief valve 12. The reduction in the pressure in the chamber 23 immediately reduces pressure at the right hand side of piston 15 so that the higher upstream pressure applied to the left hand side of the piston actuates the piston to the right and, acting through the stem 32, insures operation of the pilot valve 14 to its fully opened position. The flow of fluid from the central chamber 23 reduces the pressure therein which causes fluid to flow from the chamber 13 through conduit 28 which, in turn, reduces the pressure in the chamber 13. The reduction of pressure in the chamber 13 produces a pressure differential acting on the relief valve 12 which causes it to move bodily to the left against the action of the spring 19 to open the Venturi section 11. As the reduction in pressure in chamber 13 occurs suddenly, the relief valve 12 is moved to its fully open position with a snap action.

The fluid then escapes through the Venturi section 11 of the relief valve 15 and returns to the reservoir 8. Moreover, the Venturi section 11 produces "cavitation" of the fluid flowing through it. The cavitating Venturi 11 then produces a substantially constant mass flow rate independent of downstream pressure fluctuations which may vary from a value equal to the vapor pressure of the fluid to a value approaching 90% of the upstream pump pressure. Thus, the cavitating Venturi relief passage 11 constitutes a flow limiter with no other flow system alterations. Relief valve 12 remains open until the resulting forces produced by the piston 15, springs 31 and 33 and fluid pressure, acting on the pilot valve 14, move it to close position. When the pilot valve 14 closes, the pressure in the chambers 23 and 13 increases to move the piston 15 to the left as viewed in FIGURE 1 and move the relief valve 12 to the right. Thus, relief valve 12 moves to the position initially described to close conduit 10.

Figure 2:
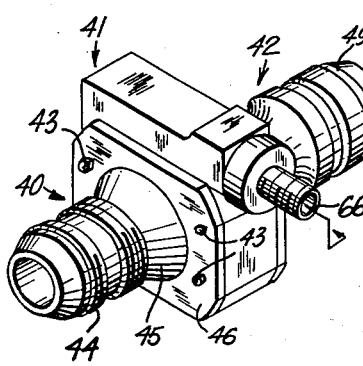
FIGURE 2 is a perspective view of a relief valve incorporating the present invention.
Figure 3:
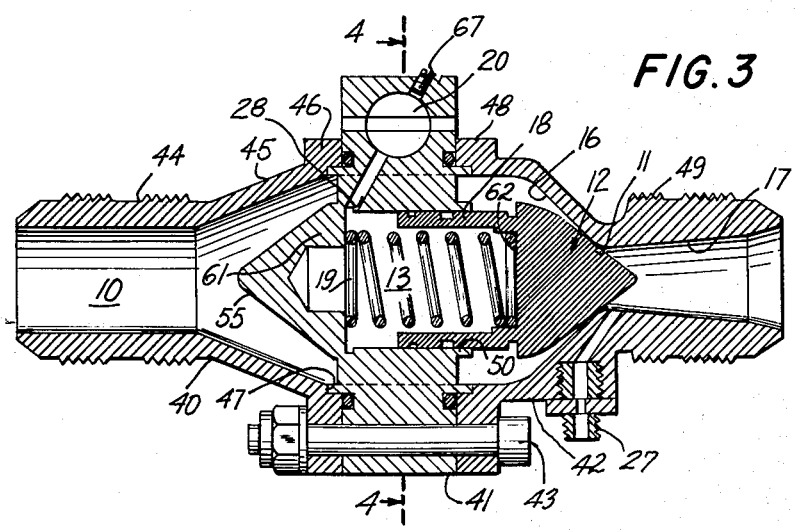
FIGURE 3 is a longitudinal sectional view through the valve to show its sectional construction, the right-angular arrangement of the relief and pilot valves and the Venturi section in the fluid passage through the valve body.
Figure 4:
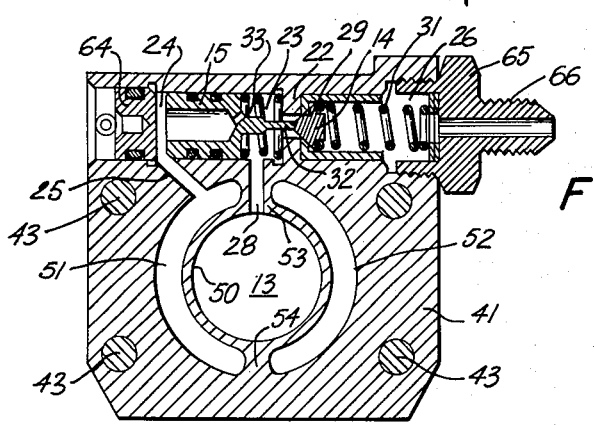
FIGURE 4 is a transverse sectional view taken on line 4—4 of FIGURE 3 to show the construction of the pilot valve and its operating mechanism.

FIGURES 2 to 4, inclusive, illustrate a preferred construction of the relief valve 5. As shown in FIGURES 2 and 3, the body of the valve 5 comprises three separate sections 40, 41 and 42 connected in abutting side-by-side relation by bolts 43. Section 40 comprises an inlet nipple 44 and a diverging wall section 45 terminating in a peripheral flange 46. The inner peripheral edge of the wall section 45 has an annular recess 47 for receiving an interlocking annular flange on the intermediate section. The other end section 42 has a peripheral flange 48 adjacent the intermediate section 41, a converging wall section 16 and diverging wall section 17 forming the Venturi throat 11 therebetween. The diverging wall section 17 has an annular periphery 49 forming a nipple for connection in the loop circuit 9.

The intermediate section 41 is cored to provide a cylindrical chamber 13 with a peripheral wall 50, see FIGURE 4, and arcuate grooves 51 and 52 at opposite sides of the cylindrical wall. The cylindrical wall 50 forming chamber 13 is connected to the remainder of the section 41 by metal keys 53 and 54 extending throughout the length of chamber 13 between the ends of the arcuate grooves 51 and 52. One end of the chamber 13 is closed by a conical wall 55, see FIGURE 3, projecting from one side of the intermediate section between the grooves 51 and 52 and into the open end of the diverging wall 45 of the end section 40. The opposite end of the chamber 13 is open. Thus, the body of the relief valve 5 formed by the assembled sections 40, 41 and 42 provides a straight line passage or conduit 10 for fluid through the inlet nipple 44 and passage formed by diverging wall 45, the arcuate grooves 51 and 52 in the intermediate section 41 and the passage through the hollow outlet section 42 having the Venturi section 11. The bolts 43 extend through the peripheral flanges 46 and 48 of the sections 40 and 42 and through aligned holes in the intermediate section 41. As in FIGURE 1, the converging wall 16 of the section 42 forms a conical valve seat engaged by the head of the valve 12.

As shown in FIGURE 3, the valve stem 18 is in the form of a sleeve which projects rearwardly from the valve head 60 and loosely fits the inside surface of the cylindrical wall 50 forming chamber 13. A spring 19 is positioned in the hollow sleeve of the valve 12 and acts between a shoulder 61 on the closure end 55 and shoulder 62 on the body of the valve to yieldingly press the head 60 of the valve into seating engagement with the Venturi section 11 of the casing.

In the embodiment of the invention illustrated in FIGURES 2 to 4, the passageway 20 is formed in a portion of the intermediate section 41 of the casing projecting beyond sections 40 and 42 and the passageway extends at right angles to the main passageway or conduit 10 through the relief valve. As shown in FIGURE 4, the chambers 24 and 26 are formed by aligned cylindrical holes bored in the intermediate sections 41 from opposite sides. Chamber 24 is formed by inserting a closure element 64 in the outer end of one of the bored holes at the rear of the piston 15; and the chamber 26 formed by the counter-bored transverse partition wall 22 and closure element 65 having a nipple 66 projecting therefrom. The chamber 23 is formed between adjacent sides of piston 15 and partition wall 22. The pilot valve 14 is mounted in the chamber 26 and actuated to close opening 29 in wall 22 by the spring 31. The conduit 28 is in the form of a passageway extending from chamber 13 through the connecting key 53 to the central chamber 23 while the conduit 25 is a passageway in the intermediate section 41 and extending from one of the arcuate grooves 51 to the rear of the piston 15. It will be noted by reference to FIGURE 3 that passageway 28 is drilled from the outside of the intermediate section 41 at an angle after which the end of the passageway is closed by a plug 67 and passageway 25 is drilled at an angle from the open end of passageway 20. The conduit 27 connecting the chamber 26 to the conduit 10 downstream from the valve 12 (not shown in FIGURES 2 to 4) is connected between the nipple 66 projecting from passageway 20 and the nipple 49 projecting from the end section 42.

The relief valve shown in FIGURES 2 to 4 operates in the same way as explained with respect to FIGURE 1.

It will now be observed that the present invention provides a pilot operated relief valve adapted for cryogenic and corrosive fluids which avoids the necessity of dynamic sealing elements. It will also be observed that the present invention provides a pilot operated relief valve which is adapted to snap open and is chatter-free in operation. It will also be observed that the present invention provides a relief valve having a cavitating Venturi section for producing a constant mass flow rate with a wide range of variations in the downstream pressure. It will still further be observed that the present invention provides a pilot operated Venturi relief valve which is of simple and compact construction, of small size for producing the required flow rate, having a low pressure drop and a flow limiting characteristic, and one which is reliable in operation to open a fluid transmission system when a predetermined pressure is exceeded.

While two embodiments of the invention are herein illustrated and described, it will be understood that further changes may be made in the construction and arrangement of elements without departing from the spirit or scope of the invention. Therefore, without limitation in this respect, the invention is defined by the following claims.

I claim:

1. A pilot operated relief valve for producing a substantially constant mass flow rate at varying downstream pressures comprising a casing forming a first passageway for the flow of liquid in a straight line therethrough, the casing having adjacent converging and diverging walls to form a cavitating Venturi throat in the passageway, an annular wall in the passageway upstream from the Venturi throat and attached to the casing at spaced points, said annular wall being closed at the upstream end and open at the downstream end, a poppet relief valve having a head engaging the converging wall to close the conduit and a stem projecting into the open end of the annular wall to form a chamber, a second passageway in the casing, a transverse wall in the second passageway having an outlet opening forming a valve seat, a pilot valve in the second passageway at one side of the transverse wall for closing the outlet opening, a spring acting on the pilot valve to move it to closed position, a piston in the passageway at the opposite side of the transverse wall from the pilot valve and having a stem in alignment with the pilot valve, a spring acting between the transverse wall and piston, a passage in the casing connecting the first passageway upstream from the relief valve to the second passageway at the side of the piston opposite the stem, a passage in the casing connecting the chamber between the annular wall and poppet relief valve in the first passageway to the second passageway between the piston and pilot valve, and a connection between the second passageway at the rear of the pilot valve and the diverging wall of the Venturi throat down stream from the poppet valve.

2. A pilot operated relief valve in accordance with claim 1 in which the first passageway in the casing is enlarged around said annular wall and comprising an inlet section, an intermediate section and an outlet section, bolts for holding the sections in assembled side-by-side relation, and said intermediate section mounting said annular wall and said inlet and outlet sections diverging and converging, respectively, to form the enlargement in the passageway around said annular wall.

3. A pilot operated relief valve in accordance with claim 2 in which the outlet section has the converging-diverging walls forming the cavitating Venturi throat, and the separate communicating passages being formed in the intermediate section.

4. A pilot operated relief valve in accordance with claim 3 in which the three sections cooperate to form the conduit extending in a straight line therethrough, the chamber for the main relief valve being formed in the intermediate section of the casing, and the second passageway for the pilot valve being formed in the intermediate section of the casing and extending in a direction at right angles to the direction of the other chamber.

References Cited in the file of this patent

UNITED STATES PATENTS

| | | |
|---|---|---|
| 781,913 | Schutte | Feb. 7, 1905 |
| 1,030,890 | Johnson | July 2, 1912 |
| 1,319,154 | Johnson | Oct. 21, 1919 |
| 2,807,274 | Evans | Sept. 24, 1957 |
| 2,919,714 | Mrazek | Jan. 5, 1960 |
| 3,040,771 | Droitcour | June 26, 1962 |

FOREIGN PATENTS

| | | |
|---|---|---|
| 1,054,190 | France | Oct. 7, 1953 |